United States Patent
Nelson et al.

(10) Patent No.: US 9,326,092 B2
(45) Date of Patent: *Apr. 26, 2016

(54) METHOD AND SYSTEM FOR LAUNCHING AN APPLICATION

(71) Applicant: FORD GLOBAL TECHNOLOGIES, LLC, Dearborn, MI (US)

(72) Inventors: Thomas Nelson, Plymouth, MI (US); David Anthony Hatton, Berkley, MI (US); William Donald Hass, Ypsilanti, MI (US); Hussein F. Nasrallah, Dearborn Heights, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/286,003

(22) Filed: May 23, 2014

(65) Prior Publication Data

US 2015/0341767 A1    Nov. 26, 2015

(51) Int. Cl.
*H04W 4/04* (2009.01)
*H04W 4/00* (2009.01)
*H04W 4/22* (2009.01)
(Continued)

(52) U.S. Cl.
CPC .............. *H04W 4/008* (2013.01); *H04L 67/12* (2013.01); *H04L 67/26* (2013.01); *H04W 4/025* (2013.01); *H04W 4/046* (2013.01); *H04W 4/22* (2013.01)

(58) Field of Classification Search
CPC ..... H04W 4/046; H04W 4/22; H04W 76/007; H04W 4/008; H04W 4/025; H04W 4/00; H04W 76/02; H04W 76/021; H04L 67/12; H04L 67/26; H04L 29/08; H04L 67/125

USPC ........................ 455/404.1–404.2, 569.1, 420, 455/41.1–41.2, 418, 550.1, 567, 569.2, 557, 455/3.03, 566, 414.1, 456.1
See application file for complete search history.

(56) References Cited

U.S. PATENT DOCUMENTS 6,937,158 B2    8/2005    Lansford et al.
7,324,833 B2    1/2008    White et al.
(Continued)

FOREIGN PATENT DOCUMENTS

FR    2965435 A1    3/2012

OTHER PUBLICATIONS

Thompson, iBeacon Auto: Your Car is a Beacon, (http://beekn.net/author/beekn/) 2014, 7 pages, Toronto, Canada.
(Continued)

*Primary Examiner* — Babar Sarwar
(74) *Attorney, Agent, or Firm* — Jennifer M. Stec; Brooks Kushman P.C.

(57) ABSTRACT

A mobile device comprising at least one controller in communication with one or more transceivers. The one or more transceivers are capable of communication with a vehicle computing system (VCS) and a server. The at least one controller configured to establish a communication link with the server based on an accident notification received from the VCS. The controller further configured to receive a push notification from the server. The controller further configured to search for a mobile application based on the push notification and enable the mobile application that matches the push notification. The controller further configured to communicate a post-crash message to a predefined contact via the mobile application.

20 Claims, 11 Drawing Sheets

(51) Int. Cl.
*H04W 4/02* (2009.01)
*H04L 29/08* (2006.01)

(56) References Cited

U.S. PATENT DOCUMENTS

| | | | |
|---|---|---|---|
| 8,346,310 | B2 | 1/2013 | Boll et al. |
| 8,868,254 | B2 | 10/2014 | Louboutin |
| 2008/0176537 | A1* | 7/2008 | Smoyer et al. ............ 455/414.1 |
| 2009/0106052 | A1* | 4/2009 | Moldovan ........................ 705/4 |
| 2013/0006674 | A1 | 1/2013 | Bowne et al. |
| 2013/0099892 | A1 | 4/2013 | Tucker et al. |
| 2013/0102300 | A1 | 4/2013 | Sigal et al. |

OTHER PUBLICATIONS

Barry, Ces 2014: Samsung Smartwatch to Interface with BMWs, (http//www.usatoday.com/story/money/cars/2014/01/06/reviewed-ces-bmw . . . ) USA Today, 2014, 2 pages, Las Vegas, NV.

Schumacher, Wearables in the Automotive Industry, (http://www.wearable-technologies.com/2014/05/wearables-in-the-car/) Wearable Technologies, 2014, 4 pages, Berlin.

* cited by examiner

METHOD AND SYSTEM FOR LAUNCHING AN APPLICATION

TECHNICAL FIELD

The present disclosure generally relates to vehicle infotainment systems, and more particularly, to systems and methods using applications on mobile devices in infotainment systems.

BACKGROUND

U.S. Pat. No. 7,324,833 generally discloses an audio system that may include an electronic device having a display, a memory, an audio file player, and a housing component at least partially defining a cavity in which the memory and the audio file player are secured. The electronic device may be a portable MP3 player. The system may also include a processor or playlist engine that can maintain a first playlist and a second playlist. In practice, the first playlist may include a selection of audio content having a corresponding audio file saved in the memory of the electronic device. The system may also include an automobile having an automobile sound system that has a speaker and an in dash sound system component, which may be removably coupled to the electronic device via a cable. The in dash sound system component may have a selector, which may be, for example, a button, that allows a user to select the first playlist for outputting via the speaker. The cable interconnecting the electronic device and the in dash sound system component may be capable of providing power to the electronic device in addition to communicatively coupling the electronic device to the automobile sound system.

U.S. Pat. No. 8,346,310 generally discloses a vehicle-based computing apparatus including a computer processor in communication with persistent and non-persistent memory. The apparatus also includes a local wireless transceiver in communication with the computer processor and configured to communicate wirelessly with a wireless device located at the vehicle. The processor is operable to receive, through the wireless transceiver, a connection request sent from a nomadic wireless device, the connection request including at least a name of an application seeking to communicate with the processor. The processor is further operable to receive at least one secondary communication from the nomadic device, once the connection request has been processed. The secondary communication is at least one of a speak alert command, a display text command, a create phrase command, and a prompt and listen command.

U.S. Patent Application 2013/0102300 generally discloses a system for automatically restarting an application running on a smartphone present in a predetermined environment, after the application has been paused. A hardware interconnect apparatus may be configured to establish a first communications link with the smartphone, and also to establish a second communications link with an electronic device present at the predetermined environment. A processor executable auto launch application may be adapted to run on the smartphone to detect when a previously selected application has been at least one of stopped or paused, and to automatically re-start the previously selected application without a command being physically entered on the smartphone by a user of the smartphone.

SUMMARY

In a first illustrative embodiment, a call center system comprising a server having one or more transceivers to communicate with a wireless device. The server configure to establish communication with a wireless device via the one or more transceivers. The server further configured to receive at least a portion of accident data from the wireless device. The server further configured to transmit a push notification to the wireless device to initiate a crash alert application.

In a second illustrative embodiment, a mobile device comprising at least one controller in communication with one or more transceivers. The one or more transceivers are capable of communication with a vehicle computing system (VCS) and a server. The at least one controller configured to establish a communication link with the server based on an accident notification received from the VCS. The controller further configured to receive a push notification from the server. The controller further configured to search for a mobile application based on the push notification and enable the mobile application that matches the push notification. The controller further configured to communicate a post-crash message to a predefined contact via the mobile application.

In a third illustrative embodiment, a computer-program product embodied in a non-transitory computer read-able medium that is programmed for communicating accident data from a vehicle computing system (VCS) to at least one server. The computer-program product comprising instructions for establishing a communication link with the server based on an accident notification received from the VCS. The computer-program product further comprising receiving a push notification from the server and searching for a mobile application based on the push notification. The computer-program further comprising enabling the mobile application that matches the push notification and communicating a post-crash message to a predefined contact via the mobile application.

DETAILED DESCRIPTION

Figure 1:
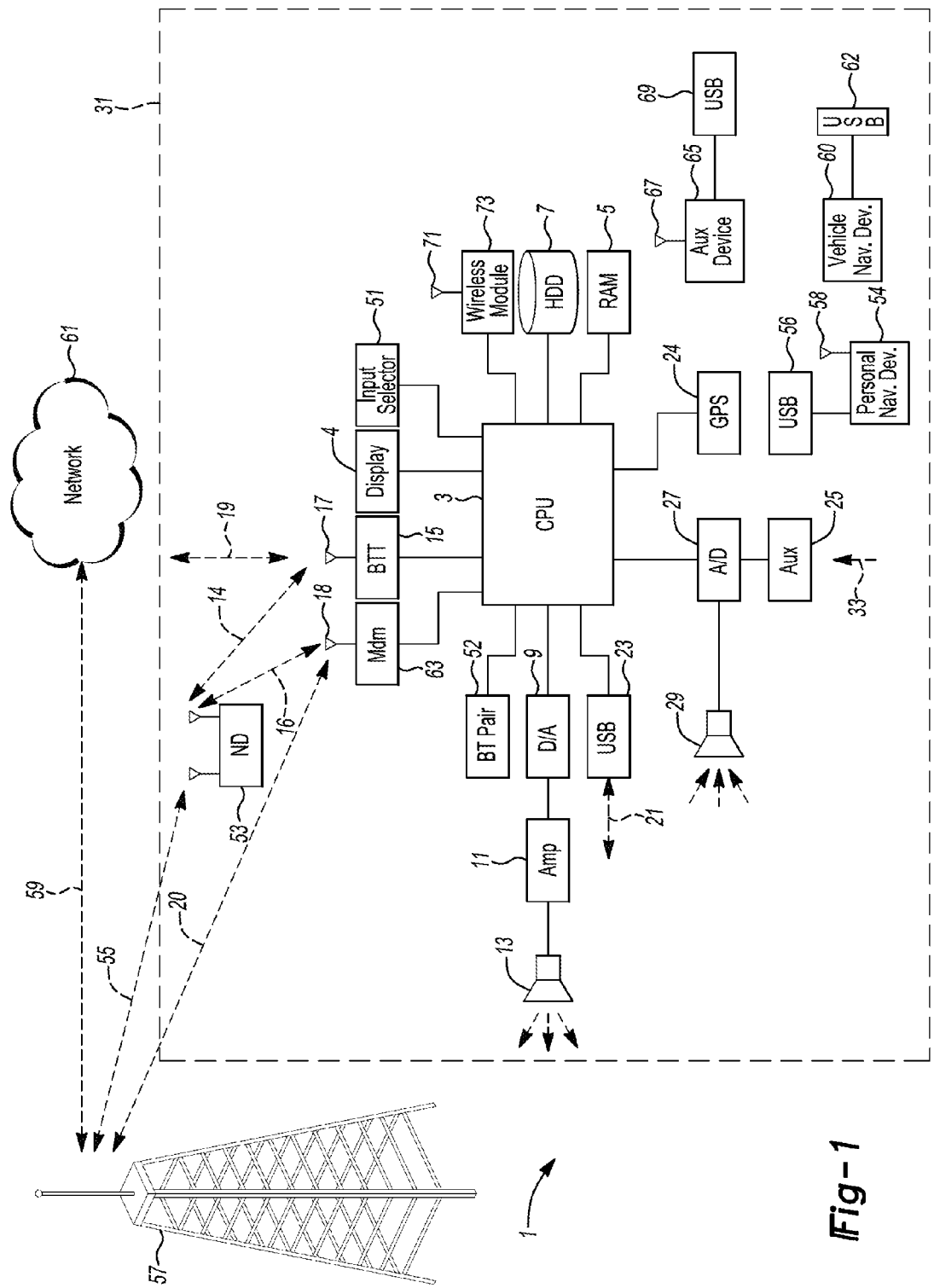
FIG. 1 is an exemplary block topology of a vehicle infotainment system implementing a user-interactive vehicle information display system according to an embodiment.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programmed to perform any number of the functions as disclosed.

A vehicle may include a computing system that is configured to allow a communication link between one or more wireless devices (i.e., nomadic devices). The nomadic device may communicate with the vehicle computing system using wireless and/or wired technology. The communication link enables the vehicle computing system to connect to application(s) on the nomadic device. The information communicated via the application(s) between the vehicle computing system and the nomadic device may include internet radio, social media information, and/or navigation data. The applications may also include driver safety related information including, but not limited to, 24-Hour roadside assistance, 911 ASSIST™ and/or call center services.

The one or more applications on the nomadic device may have several states of operation including, but not limited to, enabled running in the foreground, enabled running in the background, and/or disabled. The application state of operation may determine whether the vehicle computing system may receive data once communication is established with the nomadic device. The vehicle computing system may require that the application on the smartphone be enabled and running in the foreground such that the system may communicate with the application. For example, if the nomadic device, such as a smartphone, establishes communication with the vehicle computing system, the application(s) that is either running in the background and/or disabled on the smartphone may not communicate data with the vehicle computing system.

The method and system for initiating (i.e., launching) an application on the nomadic device once communication with the vehicle computing system is established may be disclosed in this document. The vehicle computing system includes one or more applications executed on the hardware of the system to communicate with the nomadic device. The vehicle computing system may communicate with the nomadic device based on one or more wireless technologies. This disclosure may allow for the vehicle computing system to provide a means of sending wakeup notifications to the nomadic device using wireless technology (e.g., Bluetooth Low Energy). This disclosure may also allow for the vehicle computing system to automatically launch one or more application at the nomadic devices via the notification.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

Figure 2:
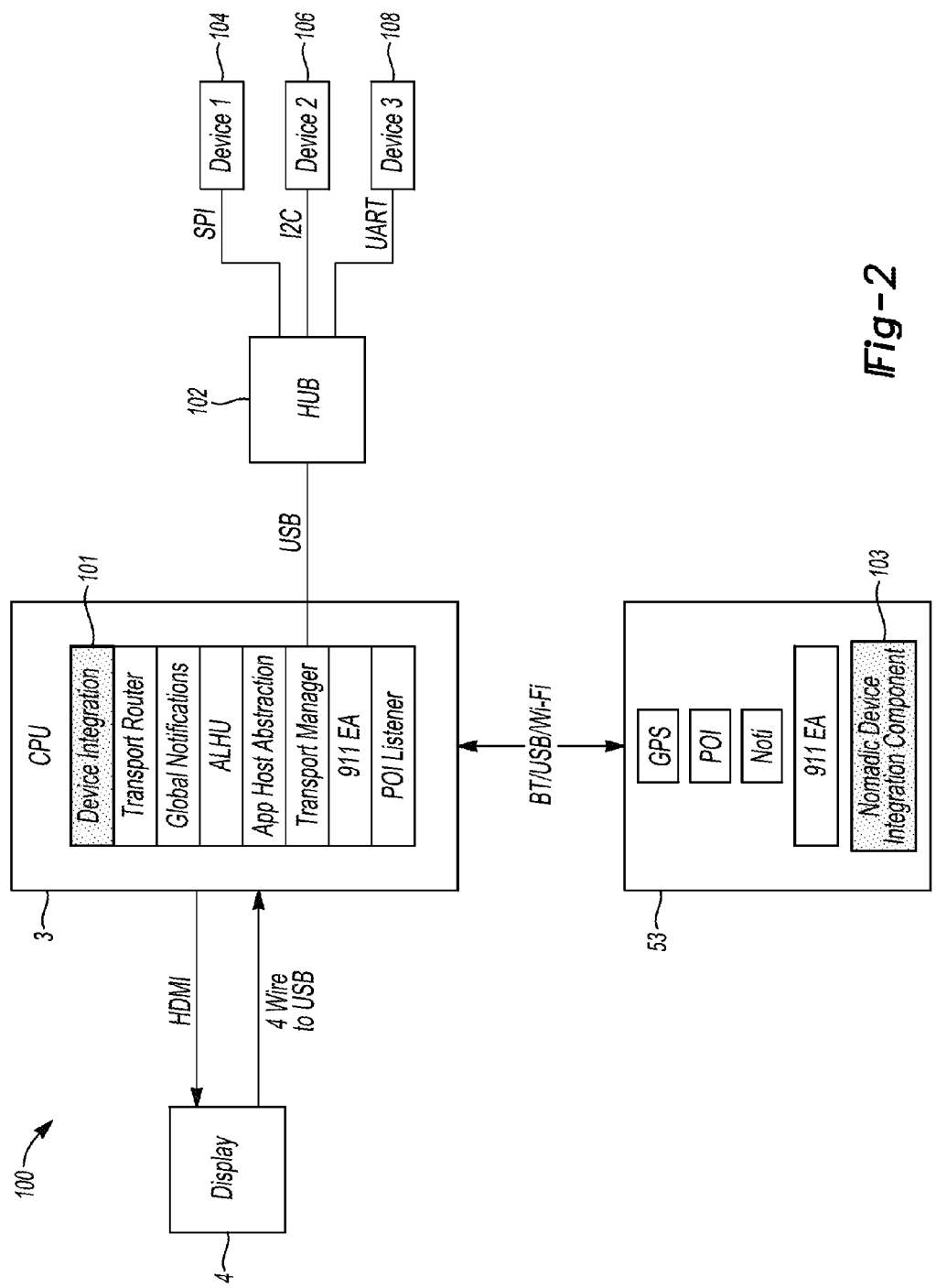
FIG. 2 is an exemplary block topology of a system for integrating one or more connected devices with the vehicle based computing system according to an embodiment.

FIG. 2 is an exemplary block topology of a system 100 for integrating one or more connected devices with the VCS 1. The CPU 3 may be in communication with one or more transceivers. The one or more transceivers are capable for wired and wireless communication for the integration of one or more devices. To facilitate the integration, the CPU 3 may include a device integration framework 101 configured to provide various services to the connected devices. These services may include transport routing of messages between the connected devices and the CPU 3, global notification services to allow connected devices to provide alerts to the user, application launch and management facilities to allow for unified access to applications executed by the CPU 3 and those executed by the connected devices, accident detection notification (i.e., 911 ASSIST™), and point of interest location and management services for various possible vehicle 31 destinations.

As mentioned above, the CPU 3 of the VCS 1 may be configured to interface with one or more nomadic devices 53 of various types. The nomadic device 53 may further include a device integration client component 103 to allow the nomadic device 53 (e.g., smartphone) to take advantage of the services provided by the device integration framework 101. The device integration client component 103 may be referred to as an application. The application is executed on hardware of the nomadic device 53. The application may communicate data from the nomadic device to the VCS 1 via the transceiver.

The one or more transceivers may include a multiport connector hub 102. The multiport connector hub 102 may be used to interface between the CPU 3 and additional types of connected devices other than the nomadic devices 53. The multiport connector hub 102 may communicate with the CPU 3 over various buses and protocols, such as via USB, and may further communicate with the connected devices using various other connection buses and protocols, such as Serial Peripheral Interface Bus (SPI), Inter-integrated circuit (I2C), and/or Universal Asynchronous Receiver/Transmitter (UART). The multiport connector hub 102 may further perform communication protocol translation and interworking services between the protocols used by the connected devices and the protocol used between the multiport connector hub 102 and the CPU 3. The connected devices may include, as some non-limiting examples, a radar detector 104, a global position receiver device 106, and a storage device 108.

Figure 3:
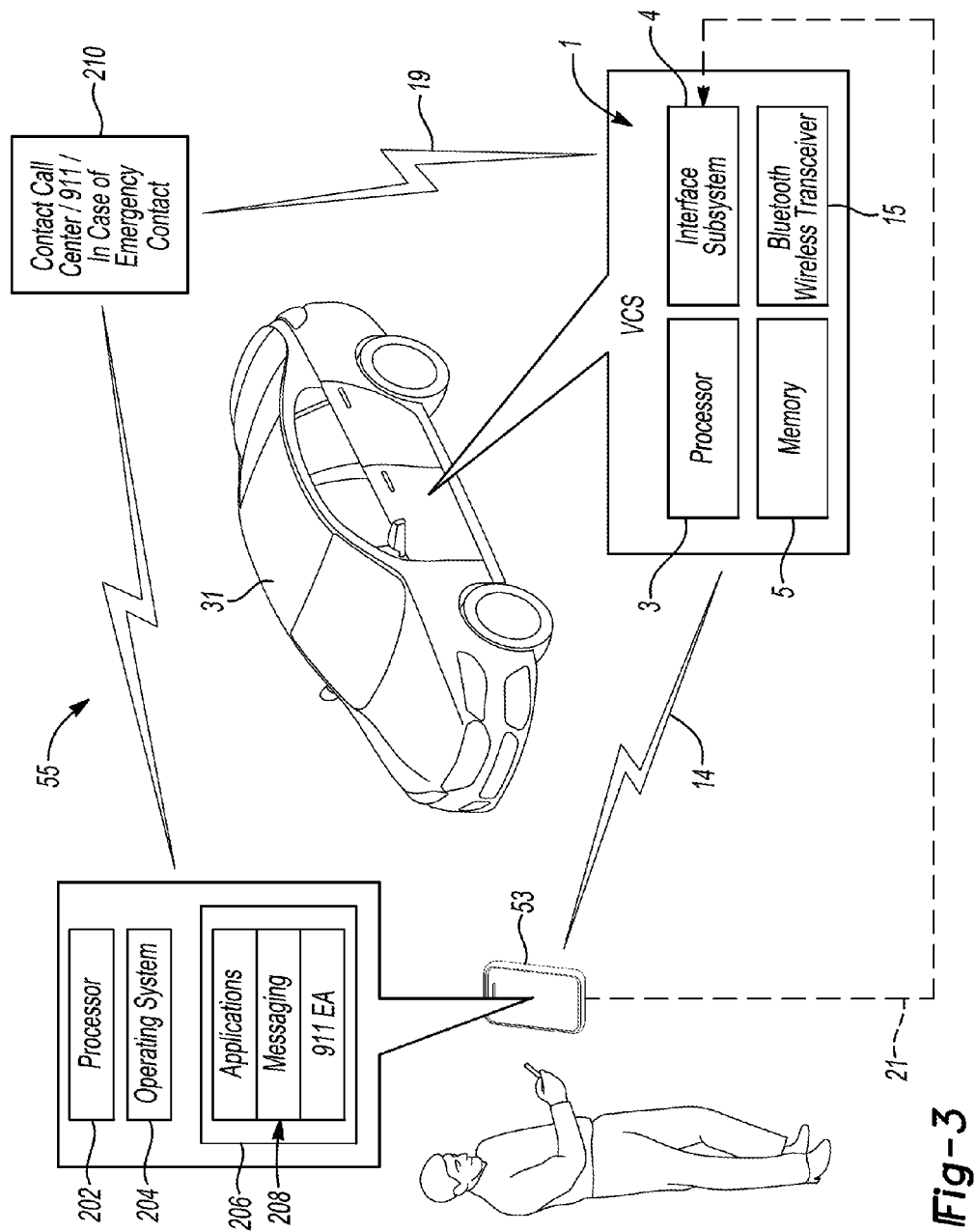
FIG. 3 is an exemplary block topology of a system for automatically starting an application when connecting a wireless device with the vehicle computing system according to an embodiment.

FIG. 3 is an exemplary block topology of a system for automatically starting the application at the nomadic device 53 when connecting with the VCS 1 according to an embodiment. The nomadic device 53 may include at least one processor 202, an operating system 204, a transceiver (not shown), and memory 206 to store one or more applications 208. The VCS 1 may include, but is not limited to, the processor 3, memory 5, the interface system (i.e., touchscreen display 4), and the transceiver 15 (e.g., Bluetooth wireless transceiver).

The VCS 1 may initialize and/or enable hardware components of the system based on a wakeup indicator (not shown). The wakeup indicator may include, but is not limited to, a vehicle start request, a touch or pull of a door handle, a signal received from a seat sensor, and/or a combination thereof. The wakeup indicator may enable one or more transceivers of the VCS 1 to broadcast a signal 14 to search for the nomadic device in proximity of the vehicle 31. For example, the VCS 1 may be configured to transmit the signal 14 (e.g., Bluetooth Low Energy, Near Field Communication, etc.) in a predefined periodic interval, in a predefined continuous period, and/or a combination thereof. In another example, the VCS 1 may communicate with the nomadic device 53 via a wired connection 21. The VCS may transmit a broadcast signal via the wired connection 21. For example, once a user connects the nomadic device 53 via a wired connection, the VCS 1 may push a notification to wakeup/initialize one or more applications at the nomadic device 53. The notification may include, but is not limited to, a unique identifier associated with the one or more applications.

The wireless broadcasted signal 14 may be generated by the wireless transceiver 15. The wireless broadcast signal 14 may notify the presence of the VCS 1 to the nomadic device 53. For example, the wireless transceiver 15 may include, but is not limited to, an iBaeacon broadcast. The wireless transceiver generating the iBeacon signal may include, but is not limited to, a low-powered wireless transceiver 15. The iBeacon broadcast generated by the wireless transceiver 15 may send a push notification to the nomadic devices (i.e., wireless devices) in close proximity of the VCS 1.

The iBeacon may use a Bluetooth Low Energy (BLE) proximity sensing to transmit a universally unique identifier (UUID). The UUID is an identifier standard that may be used to uniquely identify the application on the nomadic device 53 associated with the VCS 1. For example, the nomadic device 53 may include an application with the UUID (e.g., a sixty-four hexadecimal character identifier).

The VCS 1 may receive a wakeup indicator to begin the iBeacon broadcast comprising the UUID. The iBeacon broadcast may be transmitted to one or more nomadic devices 53 in proximity of the vehicle 31. The iBeacon broadcast may include the UUID associated with the application stored at the nomadic device 53.

The nomadic device 53 may receive the UUID in which the operating system 204 may process. The nomadic device 53 may determine if an application 208 matches the UUID. If a match is found, the nomadic device 53 may launch the application. The nomadic device 53 may launch the application via the iBeacon UUID in several application operating states including, but not limited to, running in the background, suspended, and/or in a terminated state.

Once the application is launched, the nomadic device 53 may transmit data to the VCS 1 to notify that the application is executed. For example, referring back to the accident notification application, the nomadic device 53 may transmit a message notifying the VCS 1 that the application is monitoring if an accident has occurred. The nomadic device 53 may transmit and receive data to/from the VCS 1 via generic attribute profile protocol (i.e., GATT).

The VCS 1 may monitor via one or more sensors to determine if an accident has occurred. If an accident is detected, the VCS 1 may transmit a message via the wireless signal 14 to the nomadic device 53. For example, the 911 ASSIST™ application 208 on the nomadic device 53 may already be enabled based on the iBeacon broadcast signal such that the received message may be processed and used by the application to instruct the device to contact a call center 210.

In another example, the VCS may monitor via one or more sensors to determine if an accident has occurred. If an accident is detected, the VCS 1 may transmit the iBeacon comprising the UUID to execute the 911 ASSIST™ application 208 at the nomadic device 53. Once the 911 ASSIST™ application 208 is executed, the nomadic device 53 may receive accident information. The nomadic device 53 may transmit the accident information to the call center 210.

In another example, the VCS 1 may have an embedded cellular modem (not shown) such that if an accident is detected the system may transmit the accident information data via a wireless signal 19 to a network in communication with the call center 210. In this example, the VCS 1 may also transmit the iBeacon to the nomadic device 53 to enable post crash notification messages to one or more predefined contacts via the 911 ASSIST™ application 208. Once the application 208 is enabled, the system may transmit post crash notification information via the nomadic device 53 to the one or more predefined/preconfigured contacts. The 911 ASSIST™ application 208 may forward this information to one or more preconfigured contacts using SMS, text messages, emails, and/or a social media platforms.

Figure 4:
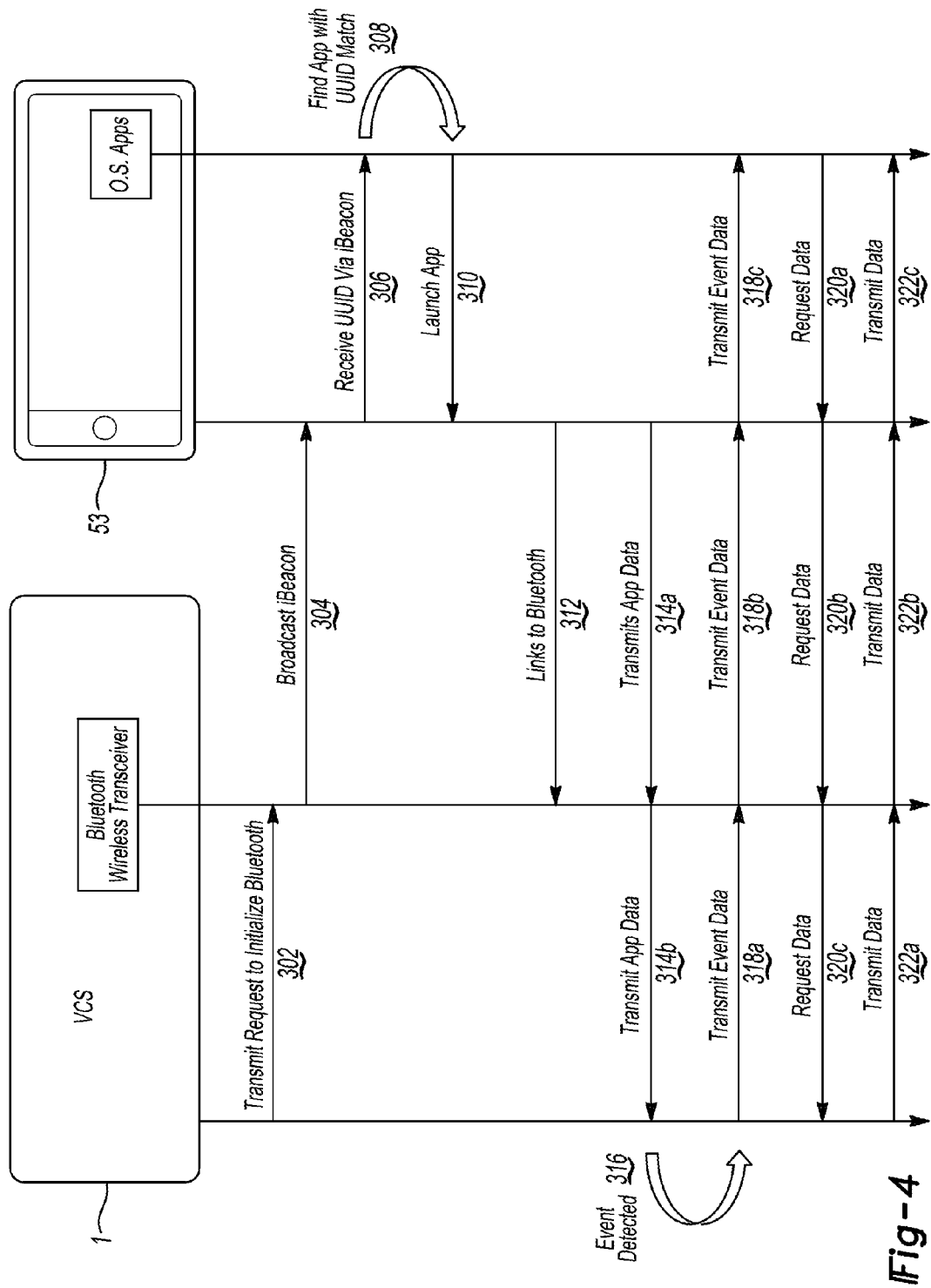
FIG. 4 is a block diagram illustrating the vehicle computing system in communication with the nomadic device.

FIG. 4 is a block diagram illustrating the VCS 1 in communication with the nomadic device 53. The VCS 1 may establish a wireless connection with the nomadic device 53. The VCS 1 may communicate with one or more applications on the nomadic device 53. The VCS 1 may comprise one or more applications executed on hardware of the system to provide the broadcast signal. The broadcast signal may be used to automatically launch an application residing at the nomadic device 53.

The VCS 1 may transmit a request to initialize 302 the Bluetooth wireless transceiver 15 based on the wakeup signal, a predefined periodic broadcast pulse, and/or a combination thereof. The Bluetooth wireless transceiver 15 may broadcast a wireless protocol 304, such as iBeacon, to provide a means of sending notifications to the nomadic device 53. The iBeacon broadcast may comprise a defined UUID. The UUID may be defined by an original equipment manufacturer. For example, the UUID may be generated randomly with a common tool available on most operating systems. The UUID is randomly generated and is large enough that it may be unlikely that the UUID would be duplicated.

The nomadic device 53 (e.g., smartphone, tablet, etc. . . . ) may receive 306 the UUID via iBeacon 306. The nomadic device 53 may search in the operating system software database for the mobile application that matches 308 the UUID received from the VCS 1. The nomadic device 53 may find the application that is associated with the UUID received from the VCS 1. The nomadic device 53 may launch 310 the application having the UUID even if the application is in the background, suspended, terminated, and/or the smartphone is locked.

The nomadic device 53 may establish a communication link 312 via the wireless protocol (i.e., iBeacon) using the mobile application's Bluetooth service. The mobile application being launched at the nomadic device 53 may transmit application data 314a to the VCS 1. The application data may include, but is not limited to, a status bit informing the VCS 1 that the application is running. The Bluetooth wireless transceiver 15 may transmit the application data 314b to the one or more processors at the VCS 1 for execution.

The VCS 1 may include one or more systems that notify, prevent, and/or detect when an accident has occurred. The one or more systems may include, but is not limited to, an airbag deployment system, a brake assist system, and/or a traction control system. The VCS 1 may monitor the one or more systems to determine if the vehicle has been in an accident. If the VCS 1 detects that an accident has occurred, the VCS 1 may generate accident data 318a for transmission to the nomadic device 53. The Bluetooth transceiver 15 may transmit the accident data 318b to the nomadic device 53. The nomadic device 53 may receive the accident data and execute the data 318c via the mobile application.

The application may include several features and functions including, but not limited to, contacting the call center, sending data to the call center, generating and sending message to one or more contacts, telephoning one or more contacts, and/or a combination thereof. The application may request additional data 320a, 320b, 320c from the VCS 1 regarding vehicle information and passenger information.

For example, if an accident is detected by the VCS 1, the application may request latitude and longitude data of the crash site. The application may also request passenger data including, but not limited to, seatbelt status. The VCS 1 may transmit the additional data 322a, 322b, 322c requested from the application.

The application may provide software instructions for execution on hardware at the nomadic device 53 to transmit the crash location and passenger data to the call center. The application may also provide software instructions for execution on hardware at the nomadic device to generate post crash notification messages to friends and family via short message service (SMS) and/or social network infrastructure.

Figure 5:
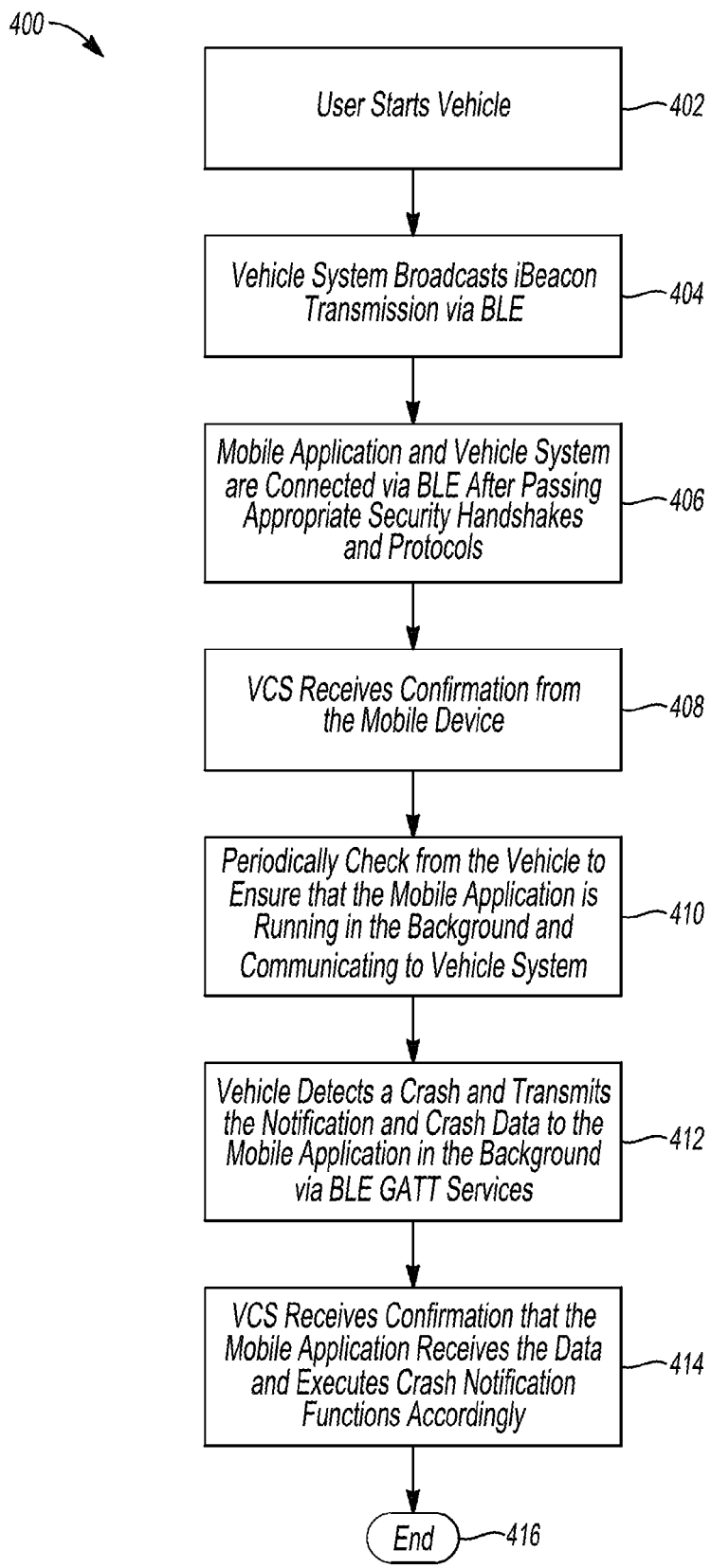
FIG. 5 is a flow chart illustrating an example method of the vehicle computing system communicating an iBeacon signal to the nomadic device to start the application according to an embodiment.

FIG. 5 is a flow chart illustrating an example method 400 of the vehicle computing system communicating a push to the nomadic device 53 to start the application according to an embodiment. The method 400 may be implemented using software code contained within the VCS 1. In other embodiments, the method 400 may be implemented in other vehicle controllers, or distributed amongst multiple vehicle controllers.

Referring again to FIG. 5, the vehicle and its components illustrated in FIG. 1, and FIG. 2 are referenced throughout the discussion of the method to facilitate understanding of various aspects of the present disclosure. The method 400 of launching the application at the nomadic device via a communication link with the VCS may be implemented through a computer algorithm, machine executable code, or software instructions programmed into a suitable programmable logic device(s) of the vehicle, such as the vehicle control module, the device control module, another controller in communication with the vehicle computing system, or a combination thereof. Although the various operations shown in the flowchart diagram 400 appear to occur in a chronological sequence, at least some of the operations may occur in a different order, and some operations may be performed concurrently or not at all.

In operation 402, a user may initialize the VCS 1 by engaging a turn-on request of a vehicle ignition system. The turn-on request enables the VCS 1 to initialize several systems, subsystems, hardware components, and/or software routines.

In operation 404, the VCS 1 may broadcast the iBeacon transmission via BLE. The iBeacon protocol may wakeup one or more applications at the nomadic device 53. The iBeacon may transmit an UUID such that a compatible application or operating system may be commanded to trigger action at the nomadic device 53. The nomadic device 53 (i.e., mobile device) may receive the iBeacon broadcast from the VCS 1. The mobile application and VCS are connected via BLE after passing appropriate security handshakes and protocols in operation 406.

In operation 408, the VCS 1 may receive confirmation from the nomadic device 53 that the iBeacon was received and/or the compatible application has been launched. The VCS 1 may periodically check that the mobile application is running in the background and is communicating to the VCS 1 in operation 410.

In one example, the VCS 1 may implement a security process to ensure that communication with the mobile application is acceptable for use in the vehicle. The VCS 1 may transmit a token to authenticate the nomadic device. The token ensures that the nomadic device may be acceptable to communicate with the VCS 1. In another example, a message protocol may be used to encode messages exchanged between the nomadic device 53 and the VCS 1 to command and control authorized communication.

In operation 412, the VCS 1 may detect a crash and transmit an accident notification via BLE GATT services to the mobile application. The VCS 1 may transmit additional data including, but not limited to, vehicle information and passenger information via the BLE GATT services.

In operation 414, the VCS 1 may get confirmation that the mobile application receives the data from the VCS 1 and executes a post-crash notification function(s) accordingly. For example, if the VCS 1 detects an accident has occurred, the system may transmit data to the nomadic device 53 via BLE GATT services. The data may include, but is not limited to latitude and longitude information. The mobile application may transmit the data received from the VCS 1 to the call center. The mobile application may also transmit data received from the VCS 1 to friends and family via post crash notification.

In operation 416, the VCS may discontinue communication with the nomadic device 53 based on several factors including, but not limited to, the location of the nomadic device 53 and/or the VCS 1 being requested to power-down. It must be noted that the mobile application at the nomadic device may continue to generate and transmit one or more post crash messages to predefined contacts after communication is discontinued with the VCS 1.

Figure 6:
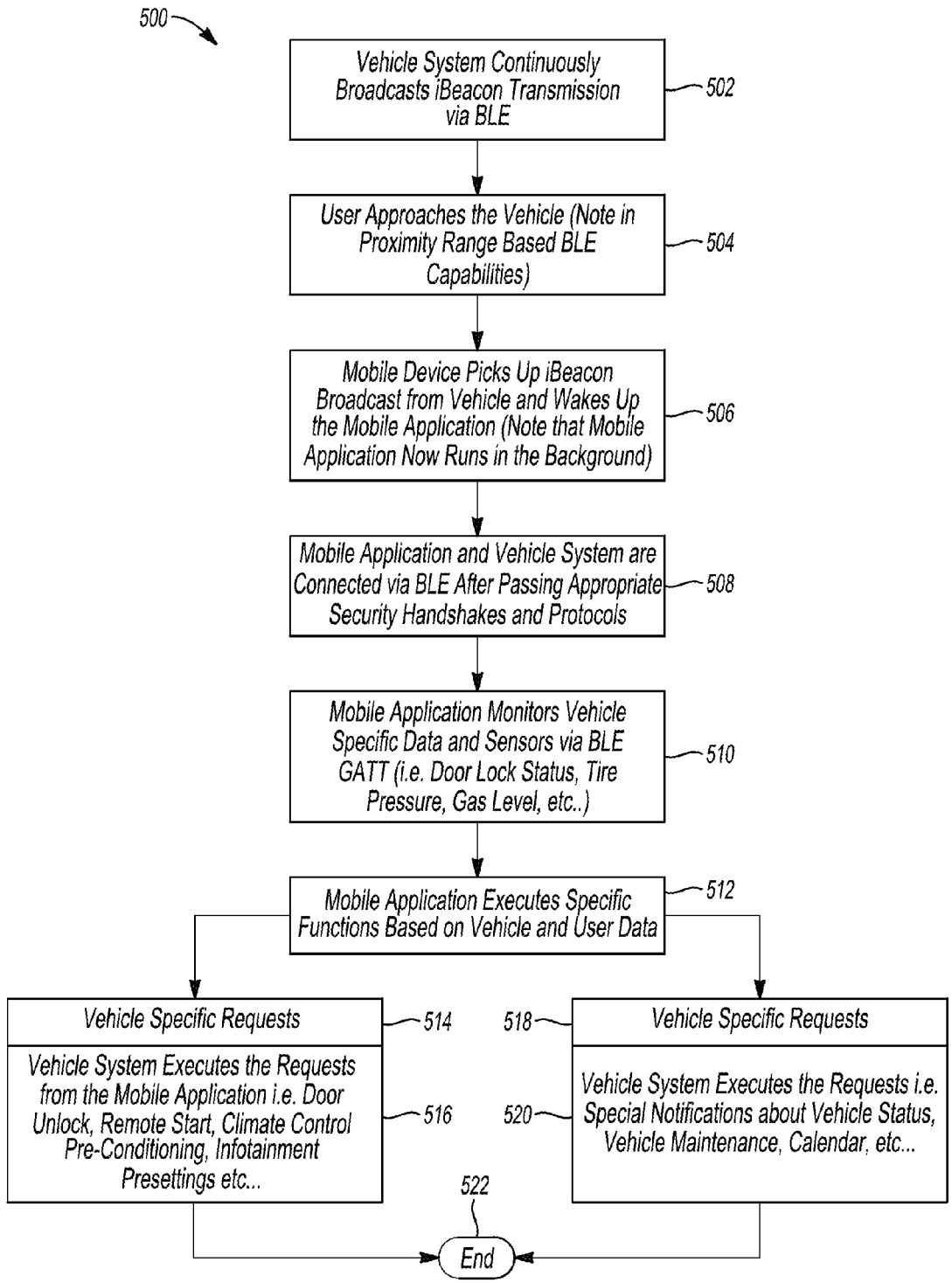
FIG. 6 is a flow chart illustrating an example method of the vehicle computing system transmitting the iBeacon signal to launch the application at the nomadic device according to an embodiment.

FIG. 6 is a flow chart illustrating an example method 500 of the vehicle computing system transmitting iBeacon to launch a mobile application at the nomadic device 53 (i.e., mobile device) according to an embodiment. The VCS 1 may transmit the iBeacon based on one or more preconfigured conditions including, but not limited to, the wakeup signal, continuously broadcasting, periodically broadcasting, and/or based on an accident notification message.

In operation 502, the VCS 1 may continuously broadcast the iBeacon transmission via BLE. The iBeacon transmission may include several messages including, but not limited to, the UUID. The BLE may include low power requirements to enable the continuous broadcast of iBeacon without discharging the vehicle battery system.

In operation 504, the VCS 1 may receive a notice that the mobile device 53 received a wireless transmission while approaching the vehicle within the proximity range of the BLE. The VCS 1 may transmit the iBeacon having a UUID in operation 506. The mobile device 53 may receive the iBeacon broadcast from the VCS 1 and wake up the mobile application associated with the UUID. For example, the mobile device 53 and vehicle handshake may be done using BLE allowing for low-power and low-latency applications from the wireless device 53 within a short range (e.g., up to 50 meters/160 feet). This facilitates the mobile device 53 being recognized by the VCS 1 as the user approaches the vehicle without using a lot of vehicle battery power.

In operation 508, the mobile application and VCS 1 may be connected via BLE after passing appropriate security handshakes and protocols. For example, the VCS 1, in communication with a passive entry passive start (PEPS) controller, and the mobile device 53 may undergo a series of communications back and forth to each other (e.g., handshaking) for vehicle access/mobile application authentication purpose. If the handshake is accomplished, the mobile device 53 may transmit the one or more security properties to the VCS 1 and/or PEPS controller. The PEPS controller and/or VCS 1 may receive from the mobile device 53 one or more securities codes.

In another example, the VCS 1 and/or PEPS controller may determine if the mobile device 53 transmitted the correct security code properties associated with that vehicle to allow communication between the VCS 1 and mobile device application. If the mobile device 53 transmitted the correct security codes associated with that vehicle, the VCS 1 and/or PEPS controller may allow control/communication request of the received vehicle data and/or functions from the mobile device 53.

In operation 510, the VCS 1 may receive a request to monitor vehicle specific data and sensors via BLE GATT communication protocol with the mobile application. For example, the mobile application may monitor door lock status, ignition status, climate controls, tire pressure, vehicle crash detection (i.e., accident occurred), gas level, etc.

In operation 512, the VCS 1 may receive specific functions based on the vehicle data and/or user data via the mobile application. The mobile application may receive vehicle and personal data and based on the data generate one or more messages. The one or more messages may include a request to control a vehicle function and/or execute a notification to a user based on a vehicle function.

In operation 514, the VCS 1 may receive a vehicle specific request via the mobile application. The VCS 1 may execute the vehicle specific request received from the mobile application in operation 516. For example, the VCS 1 may receive a request to instruct the system to notify the mobile device 53 if an accident is detected via one or more wireless transmissions of messages.

In operation 518, the VCS 1 may receive specific requests based on the vehicle data and/or user data via the mobile application. The VCS 1 may execute the application specific request received from the mobile application in operation 520. For example, the mobile application may request to be notified how many occupants are in the vehicle. The VCS 1 may monitor the number of occupants and transmit this data to the mobile application via the mobile device Bluetooth communication link.

In operation 522, the VCS 1 may discontinue communication with the mobile device 53 based on several factors including, but not limited to, the location of the mobile device 53 and/or the VCS being requested to power-down.

Figure 7:
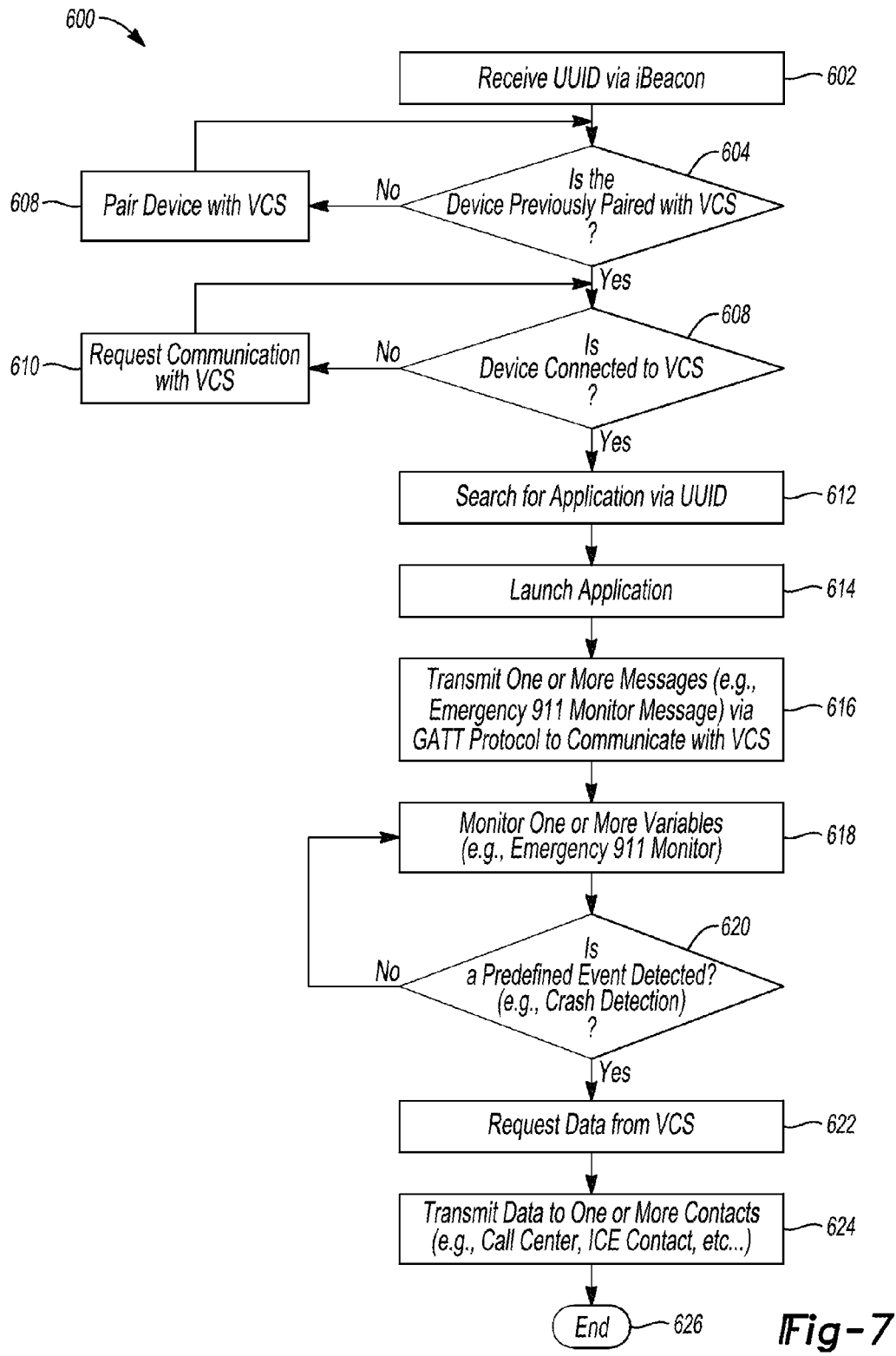
FIG. 7 is a flow chart illustrating an example method of the nomadic device receiving an application wakeup request to launch the application according to an embodiment.

FIG. 7 is a flow chart illustrating an example method 600 of the nomadic device receiving an application wakeup request to launch the application according to an embodiment. The nomadic device (i.e., wireless device, mobile device, etc. . . . ) may have one or more software applications (i.e., mobile application(s)) executed on hardware components of the device. The hardware components may include, but is not limited to, one or more transceivers, a processor, memory, and/or an operating system.

In operation 602, the mobile application may receive the UUID via the iBeacon transmission received from the VCS. The one or more mobile applications may determine if the nomadic device has been paired with the VCS. If the nomadic device has not been paired with the VCS, the VCS may request a pairing sequence in operation 606.

In operation 608, if the nomadic device has been previously paired to the VCS, the nomadic device may begin searching for one or more applications related to the UUID. If the nomadic device has an interruption in the communication link to the VCS, the mobile application may request communication with the VCS in operation 610.

In operation 612, the nomadic device may search for the one or more mobile applications that may have the same UUID as the one received from the iBeacon. If the nomadic device finds a match of the UUID associated with a mobile application, the device may launch the mobile application in operating 614

In one example, the nomadic device may implement a security process to ensure the UUID and/or the associated mobile applications are acceptable to communicate with the VCS. For example, once the nomadic device discovers the mobile application comprising the UUID, the nomadic device may check with a backend server to determine if the mobile application may be used in the vehicle.

In operation 616, the nomadic device may transmit one or more messages to the VCS via the GATT protocol. The one or more message may include at least one variable related to vehicle accident detection. The mobile application may monitor one or more vehicle accident variables via the GATT protocol in operation 618.

In operation 620, the mobile application may determine if a predefined event is detected based on monitoring the one or more variables. For example, the predefined event may include the mobile application determining if a crash is detected based on the monitoring of the one or more variables. If a crash is detected, the mobile application may request additional data from the VCS in operation 622. For example, the additional data may include, but is not limited to, the number of passengers, the location of the vehicle, and/or other accident related information.

In operation 624, the mobile application may transmit via the nomadic device the additional data to several entities including, but not limited to, a call center, 911 dispatch, police station, and/or one or more contacts preconfigured by a user. For example, the mobile application may first establish a connection with the call center and/or the 911 dispatch. The communication of information to the call center and/or 911 dispatch may allow first responders/emergency personal to assist with the accident. The nomadic device may transmit one or more messages to a preconfigured contact. The message may include, but is not limited to, an established communication connection between the contact and the user, a text message transmitted to the contact, an email transmitted to the contact, a social media message to the contact, and/or a combination thereof It must be noted that the nomadic device may have several configurations including, but not limited to, an external portable device carried by a user, an embedded device configured with the VCS, and/or a combination thereof. For example, the nomadic device being the external portable device carried by the user may be a smartphone. In another example, the embedded device configured with the VCS may include an embedded cellular telephone and/or modem.

In operation 626, the nomadic device may disable the one or more application if a user request to turn them off and/or the nomadic device is powered down.

Figure 8:
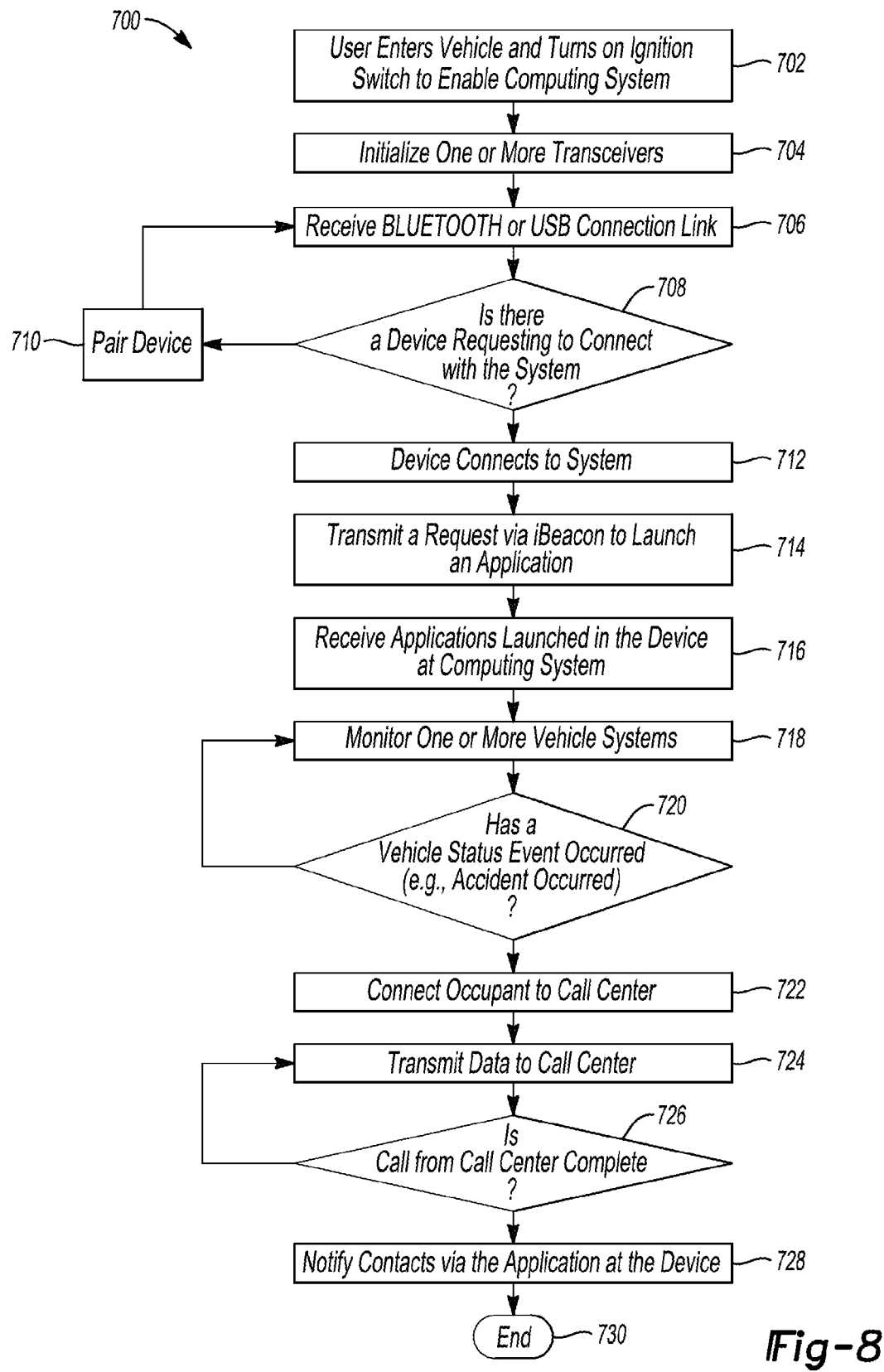
FIG. 8 is a flow chart illustrating an example method of the vehicle computing system communicating the iBeacon signal to the nomadic device to start the application according to an embodiment.

FIG. 8 is a flow chart illustrating an example method 700 of the vehicle computing system communicating the iBeacon to the nomadic device to start an application according to an embodiment. The VCS may manage the transmission of data to one or more external devices with the use of a software application executed on hardware configured with the system.

In operation 702, the user may enter the vehicle and turn-on the ignition switch to initialize the VCS. The initialization of the VCS may include a wireless protocol transmission (i.e., Bluetooth) via one or more transceivers in operation 704. The Bluetooth transmission may include the iBeacon broadcast.

In operation 706, the VCS may receive a request to connect from the nomadic device via the wireless transmission of the Bluetooth protocol or through the use of a wired connection (i.e., USB). The VCS may determine if the device is requesting to connect with the system in operation 708.

In operation 710, if the device has not been previously paired with the VCS, the system may request configuration. If the device has been previously paired with the VCS, the system may establish communication with the device via a handshake process in operation 712.

In operation 714, the VCS may transmit a request via iBeacon to launch an application configured to communicate with the system based on the UUID. The VCS may receive one or more messages to confirm related applications are launched at the device in operation 716.

In operation 718, the VCS may monitor if the one or more vehicle systems detect variables associated with the applications launched at the device. For example, the application may be related to accident detection and emergency response, therefore the VCS may monitor one or more variables related to accident detection.

In operation 720, the VCS may determine if a vehicle status event occurred (e.g., an accident has occurred). If an accident is detected, the VCS may connect an occupant in the vehicle to the call center via the application at the device in operation 722.

In operation 724, once the VCS has established a communication link to the call center via the nomadic device, the system may transmit data to the call center. The data may include, but is not limited to, vehicle location.

In operation 726, the VCS may monitor if the communication with the call center is complete. If the communication with the call center has ended, the VCS may transmit a notification to the device. The VCS may transmit a message notification to one or more predefined contacts via the application at the device in operation 728.

In operation 730, the VCS may discontinue communication with the nomadic device, however the device may continue to enable the mobile application to transmit post crash message(s) to one or more contacts.

Figure 9:
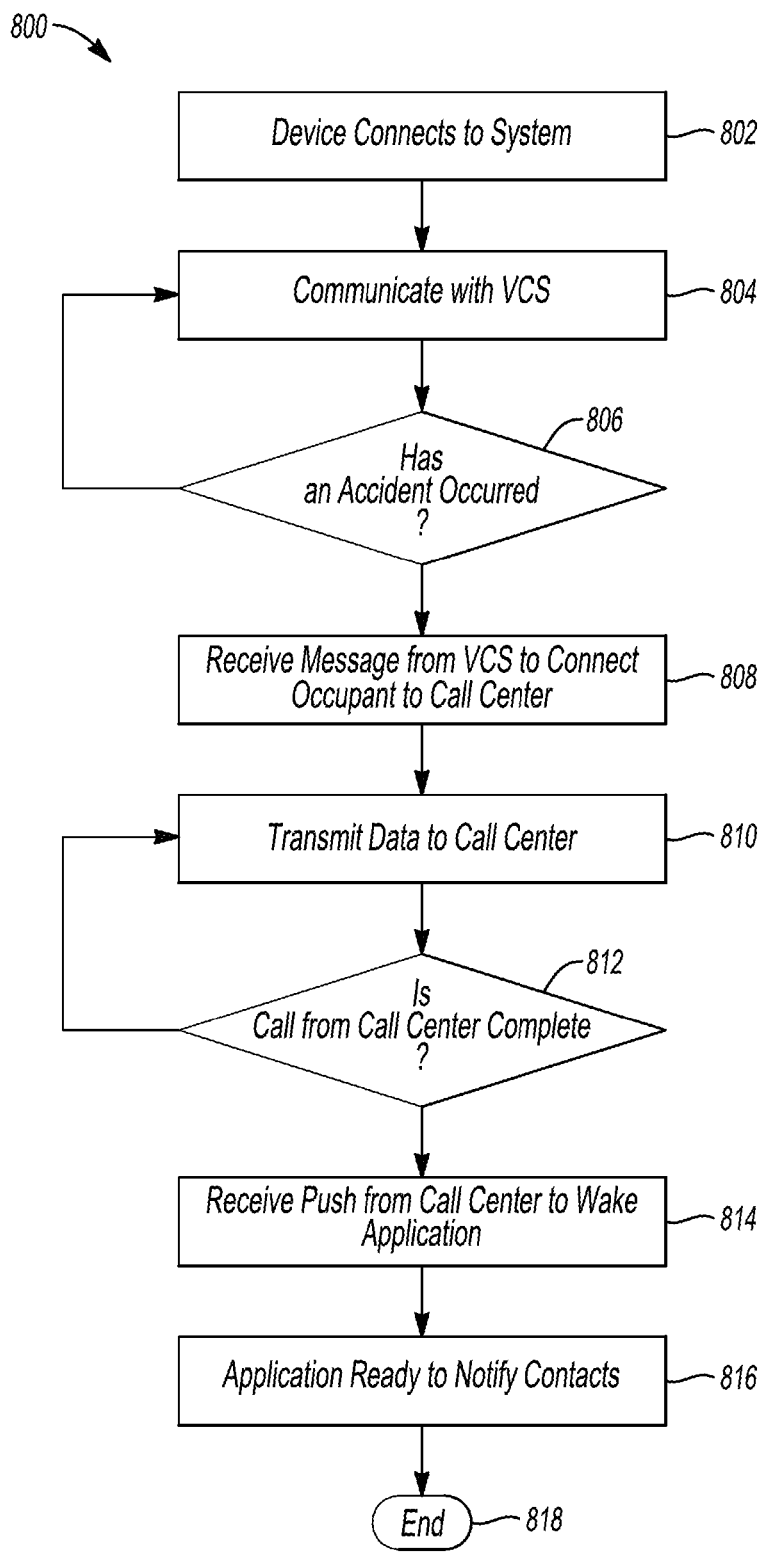
FIG. 9 is a flow chart illustrating an example method of a call center transmitting a push notification to launch the application at the nomadic device according to an embodiment.

FIG. 9 is a flow chart illustrating an example method 800 of the call center transmitting a push notification to launch the mobile application at the nomadic device. The call center may be used for the purpose of receiving or transmitting data to improve the driving experience. The call center may include, but is not limited to, at least one server, computer work stations, one or more personal (i.e., agents) to operate the computer work stations, and/or a combination thereof.

In operation 802, the nomadic device may connect to the VCS using wireless and/or wired technology. After handshaking and/or other security protocols to pair the nomadic device with the VCS, the device may begin communicating with the VCS in operation 804.

In operation 806, the nomadic device may receive data from the VCS notifying that an accident has occurred. The nomadic device may receive a message from the VCS to connect the occupant to the call center in operation 808.

In operation 810, the nomadic device may transmit data to the call center. In one example the occupant may talk with a call center agent via the connection established with the call center. In another example, the transmitted data to the call center may include, but is not limited to, vehicle location and/or the number of passengers in the vehicle.

In operation 812, the nomadic device may monitor when the communication with the call center is complete. If the communication is complete, the nomadic device may receive a push notification from the call center to wake up a mobile application at the nomadic device in operation 814. The push notification may be delivered to the device by a token and include the crash event details such as direction, time of response, severity of event.

In operation 816, in response to the push notification, the nomadic device may launch the mobile application. The mobile application may include, but is not limited to a post crash notification application. The post crash notification application may transmit one or more messages to preconfigured contacts. The post crash notification may enable immediate and automatic occupant update(s) based on the crash to at least one predefined contact. The post crash notification may be communicated to one or more contacts via SMS, text messages, emails, social networks, and/or a combination thereof. The nomadic device may disable the one or more application if a user request to turn them off and/or the nomadic device is powered down in operation 818.

Figure 10:
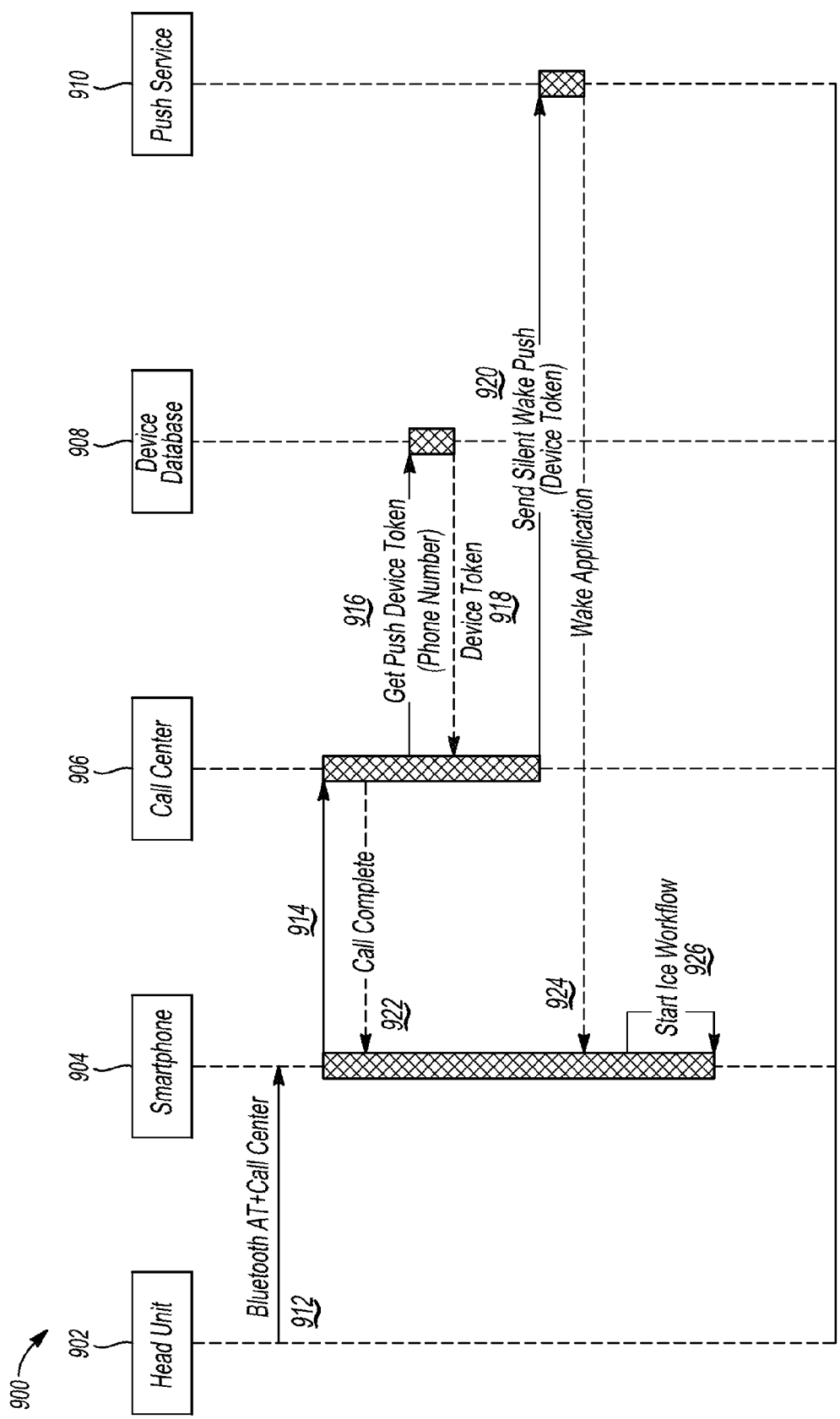
FIG. 10 is a block diagram illustrating the nomadic device communicating with the vehicle computing system and call center according to an embodiment.

FIG. 10 is a block diagram 900 illustrating the nomadic device 904 managing one or more mobile applications by communicating with the vehicle computing system 902 (i.e., head unit) and a server 906 (i.e., call center) according to an embodiment. The nomadic device 904 (i.e., smartphone) may include one or more applications executed on hardware of the device to provide additional services for the vehicle occupant. The additional services may include, but is not limited to, internet radio, climate control, navigation, accident assistance, post-crash notification, and/or other functions that may improve the driving experience.

The smartphone 904 may establish a wireless communication 912 connection with the head unit 902. The wireless communication 912 may be established based on several methods including, but not limited to, a pairing process that is an initial linkage between the head unit 902 and the smartphone 904. The wireless communication may include, but is not limited to, Bluetooth, BLE, NFC, and/or WiFi.

The one or more mobile applications at the smartphone 904 may execute certain functions based on information/data received from the head unit 902 via the wireless communication 912. For example, if the head unit 902 detects that the vehicle has been in an accident, the system may transmit a message to the smartphone 904 to perform a function. The smartphone may be instructed by the head unit 902 to establish communication with the call center 906 based on the accident detection message.

The smartphone 904 may establish communication 914 with the call center 906. The smartphone 904 comprises an operating system executed on hardware of the device that may transmit a device token to the call center 906. The device token may be sent to the call center 906 such that the smartphone 904 telephone number may be registered alongside the device token. The device token registered alongside the telephone number may be stored at a database 908. The database 908 may be associated with a vehicle manufacturer, the call center, the mobile application, and/or a combination thereof. In one example, the smartphone 904 may transmit that the vehicle has been in an accident to the call center 906. The call center 906 may match the device token using the incoming phone number received from the smartphone 904.

The call center 906 may comprise a network having one or more computers in communication via one or more servers. The call center 906 may receive crash data via the communication link 914 with the smartphone 904. In one example, the call center may have an agent that may record details of the crash in the call center database. The details may include, but is not limited to, the location, severity, and number of passengers.

The call center 906 may request 916 the device token from the database 908 based on the incoming phone number. The call center may receive 918 the device token from the database 908. After the call has ended, the call center 906 may transmit 920 a push notification using the device token to the smartphone device server 910 (i.e., push service). The push notification may include, but is not limited to, device token, vehicle data, and/or passenger data.

The push service 910 may transmit 924 a wake application request to the smartphone 904. The device token be used to identify the smartphone for the wake application request via the push notification. The smartphone 904 may receive the push notification and the requested application may wake up. In one example, the application may be a post crash notification application that is used to transmit one or more message to a preconfigured contact based on the accident notification. The post crash notification may transmit details related to the accident to an assigned server for processing. The post crash notification may also transmit details related to the accident to the preconfigured emergency contact through Hyper Text Transfer Protocol (HTTP), SMS, and/or other services.

Figure 11:
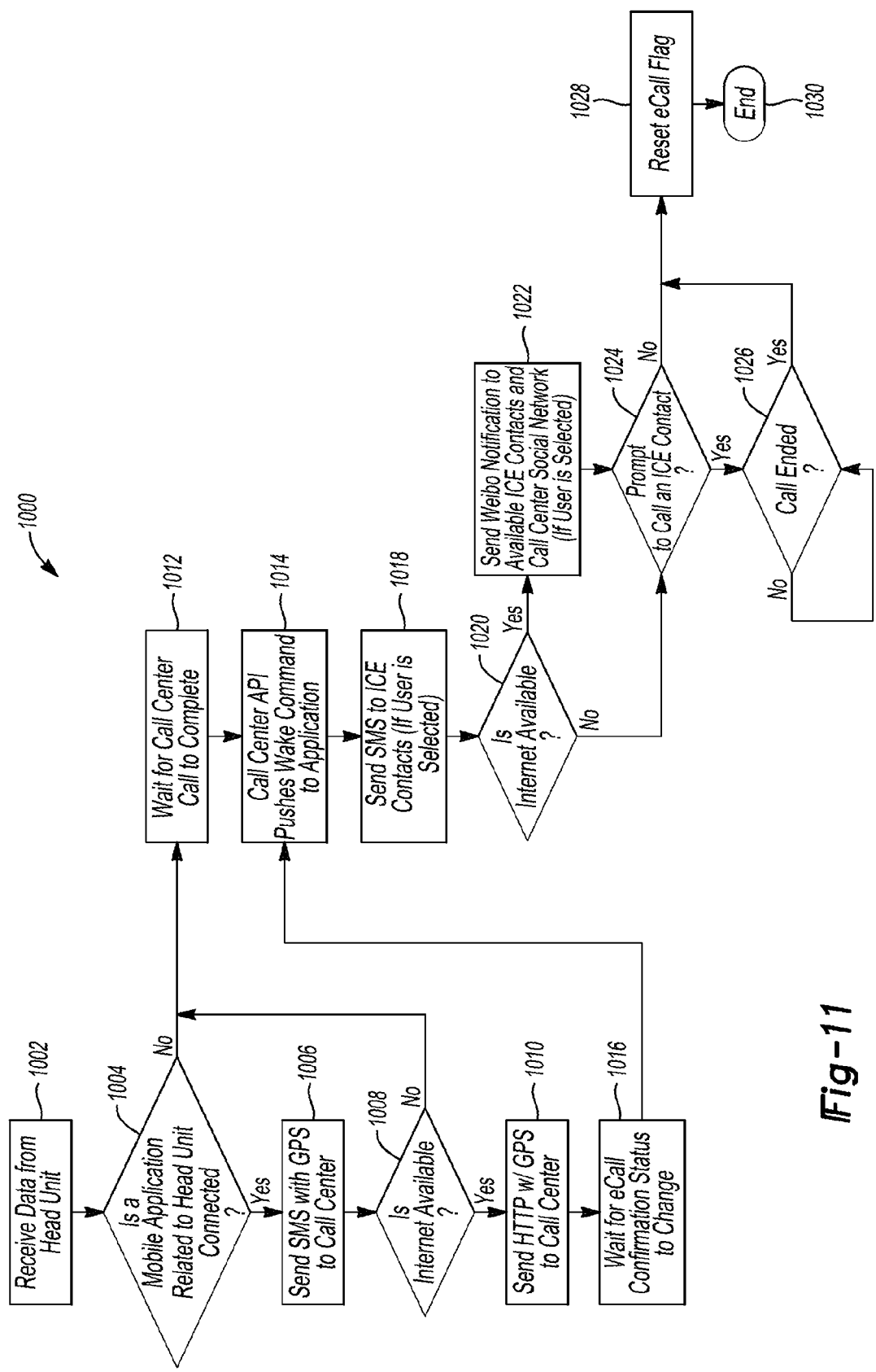
FIG. 11 is a flow chart illustrating an example method of the nomadic device communicating with the vehicle computing system and call center according to an embodiment.

FIG. 11 is a flow chart illustrating an example method 1000 of the nomadic device communicating with the vehicle computing system (i.e., head unit) and the call center (i.e., one or more servers) according to an embodiment. The method 1000 may be implemented using software code contained within the head unit, the nomadic device, the call center, and/or a combination thereof. In other embodiments, the method 1000 may be implement in other control modules in communication with the nomadic device.

In operation 1002, the nomadic device may receive data from the head unit via a wireless connection based on one or more predefined events. The one or more predefined events may be set by the mobile application executed at the nomadic device, by a user, and/or a combination thereof. The nomadic device may determine if a connection has been established with the mobile application comprising an application programming interface (API) configured to communicate with the head unit in operation 1004.

In operation 1006, if the mobile application comprising the API is connected, the nomadic device may transmit a SMS message comprising global positioning system (GPS) data to the call center. For example, if the nomadic device is executing the mobile application configured to communicate with the head unit based on the API, the device may transmit additional data to the call center via wireless communication. In another example, the nomadic device may determine if an internet connection is available and based on the connection transmit an HTTP with GPS data to the call center in operation 1010.

In operation 1016, the nomadic device may wait to receive a confirmation from the call center to determine if the information transmitted to the call center was successfully received. For example, the mobile application may attempt to transmit the data again if the initial transmission of data to the call center has failed.

In operation 1012, if the nomadic device is not communicating with the head unit via the API, and/or there is not an internet connection, the nomadic device may wait for the call center call to complete before transmitting additional data. For example, the nomadic device may monitor when the communication with the call center is complete before receiving a push notification from the call center to wake up the mobile application.

In operation 1014, once the call to the call center is complete, the call center API may push a wake command to the nomadic device. The wake command may start the mobile application requested by the API. For example, the call center may transmit a push notification having an API defined to wake up a post-crash notification application.

In operation 1018, the mobile application executed on hardware at the nomadic device may send SMS to one or more predefined contacts (e.g., in case of emergency (ICE) contacts). If an internet connection is available, the nomadic device may transmit the messages to the one or more predefined contacts via the internet in operation 1020.

In operation 1022, the mobile application may transmit one or more message notifications to available ICE contacts and/ or a social network server. For example, the one or more message notifications may include, but is not limited to, Weibo notification, social media messages, text messages, and/or email messages.

In operation 1024, if an internet connection is not available, the mobile application may transmit a request to call the one or more predefined contacts. In another example, if the internet connection is unavailable, the mobile device may text the one or more predefined contacts.

In operation 1026, the mobile application may monitor when a call has ended between the one or more predefined contacts. For example, the mobile application may automatically redial and/or dial one or more predefined contacts. The mobile application may receive a request to not call and/or communicate data to the one or more predefined contacts. If the mobile application receives a request not to call/communicate with the one or more predefined contacts, the mobile application may reset and disable the application in operation 1028.

In operation 1030, the nomadic device may disable the one or more applications if a user request to turn them off and/or the nomadic device is powered down. The mobile application may be woken up and/or re-initialized if a request is received by the head unit (i.e., VCS) and/or the call center (i.e., one or more servers).

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A call center system comprising:
   a server having one or more transceivers to communicate with a wireless device, the server configured to:
   establish communication with a wireless device via the one or more transceivers;
   receive accident data from the wireless device; and
   transmit a push notification to the wireless device to launch a crash alert application based on the accident data.

2. The call center system of claim 1, wherein the accident data is latitude and longitude coordinates.

3. The call center system of claim 1, wherein the push notification is used to search for a specific application at the wireless device configured to communicate with the server.

4. The call center system of claim 1, wherein the crash alert application comprises instructions to transmit, in response to the push notification, a message via a network outside the server via communication with a cellular tower.

5. The call center system of claim 1, wherein the crash alert application comprises instructions to transmit one or more messages to at least one of the server and a predefined contact.

6. The call center system of claim 5, wherein the crash alert application comprises instructions to transmit the one or more messages by at least one of a text message, email, and SMS.

7. The call center system of claim 5, wherein the one or more messages is at least one of a status update of a passenger.

8. A mobile device comprising:
   a controller in communication with a vehicle computing system (VCS) and a server via a transceiver, and configured to:
   transmit a VCS accident notification to the server;
   receive a push notification from the server based on the VCS accident notification;
   search for a mobile application based on the push notification;
   launch the mobile application matching the push notification; and
   communicate a post-crash message to a predefined contact via the mobile application.

9. The mobile device of claim 8, wherein the push notification is a unique identifier associated with the mobile application.

10. The mobile device of claim 8, wherein the VCS accident notification is at least one of a request to establish a communication line for an occupant to speak with an operator, and a request for latitude and longitude coordinates.

11. The mobile device of claim 8, wherein the server is associated with a call center.

12. The mobile device of claim 11, wherein the mobile application comprises instructions to generate a message for transmission to at least one of the call center or a predefined contact based on the VCS accident notification.

13. The mobile device of claim 12, wherein the mobile application may transmit the message via at least one of text, email, SMS, and a social media network.

14. The mobile device of claim 13, wherein the mobile application comprises instructions to, in response to a communication link being disconnected with the server, transmit the message via communication with a cellular tower.

15. A computer-program product embodied in a non-transitory computer read-able medium having stored instructions for programming a processor, comprising instructions for:
   establishing communication with a server based on an accident notification received from a vehicle computing system;
   receiving a push notification from the server;
   searching for a mobile application based on the push notification;
   launching the mobile application that matches the push notification; and
   communicating a post-crash message to a predefined contact via the mobile application.

16. The computer-program product of claim 15, wherein the accident notification is at least one of requesting a communication line for an occupant to speak with an operator, and requesting for latitude and longitude coordinates.

17. The computer-program product of claim 15, wherein the server is a call center.

18. The computer-program product of claim 17, wherein the mobile application comprises instructions for generating a message for transmission to at least one of the call center or a predefined contact based on the accident notification.

19. The computer-program product of claim 18, wherein the mobile application comprises instructions for transmitting the message via at least one of text, email, SMS, and a social media network.

20. The computer-program product of claim 15, wherein the mobile application comprises instructions for, in response to the communication with the server being disconnected, transmitting the message via communication with a cellular tower.

* * * * *